United States Patent [19]
Hatton

[11] Patent Number: 6,164,332
[45] Date of Patent: Dec. 26, 2000

[54] IN-LINE MAGNETIC WATER MANUFACTURING APPARATUS

[76] Inventor: Randy Hatton, HC71, Box 17A, Eagle Nest, N. Mex. 87718

[21] Appl. No.: 09/527,402

[22] Filed: Mar. 16, 2000

Related U.S. Application Data

[60] Provisional application No. 60/124,573, Mar. 16, 1999.

[51] Int. Cl.⁷ .................................................... F15C 1/04
[52] U.S. Cl. ..................... 137/827; 137/393; 137/809; 137/812; 137/222; 137/190
[58] Field of Search .................................. 222/190, 240; 137/809, 810, 811–813, 827, 393

[56] References Cited

U.S. PATENT DOCUMENTS

| | | | |
|---|---|---|---|
| 2,763,125 | 9/1956 | Kaposch et al. | 137/827 |
| 2,775,486 | 12/1956 | King | 222/190 |
| 3,712,321 | 1/1973 | Bauer | 137/812 |
| 4,145,291 | 3/1979 | Console et al. | 222/190 |
| 4,805,669 | 2/1989 | Lillicrap | 137/827 |
| 4,995,425 | 2/1991 | Weisenbarger et al. | 137/809 |
| 5,311,907 | 5/1994 | Houck | 137/810 |
| 5,687,766 | 11/1997 | Weakley | 137/812 |
| 5,839,485 | 11/1998 | Wegman et al. | 137/827 |

*Primary Examiner*—A. Michael Chambers
*Attorney, Agent, or Firm*—Dean A. Craine

[57] ABSTRACT

An apparatus designed to manufacture a relatively large quantity of living water for a home or business. The apparatus includes a plurality of ampuls longitudinally aligned and connected together to enable the water delivered to the upper ampul to flow in a vortex pattern from the upper ampul to the lower ampul. Each ampul has a water dispensing unit which facilitates the flow of the water in a vortex pattern therein. Each ampul includes a longitudinally aligned neck with several pairs of magnets longitudinally aligned on the neck that create magnetic fields around the water as it flows in a vortex pattern through the neck. The apparatus is designed to be connected to a household water supply system and includes an optional holding tank and control valve.

10 Claims, 2 Drawing Sheets

IN-LINE MAGNETIC WATER MANUFACTURING APPARATUS

This is a utility patent application based on the provisional patent application 60/124,573 filed on Mar. 16, 1999.

BACKGROUND OF THE INVENTION

1. Field of the Invention

This invention relates to manufacturing apparatus for processing liquids and, more particularly, to apparatus designed for manufacturing magnetic water.

2. Description of the Related Art

Water which has been exposed to certain magnetic fields is known as magnetic water. If the water flows in a swirling or vortex pattern through a magnetic field oriented in a specific direction, it has been postulated that the potential and kinetic energy levels of the molecules of water may be altered. Water which has been treated in this manner is known as magnetic or "living water". It has also been postulated that when "living water" is consumed by animals and plants, the living cells in these animals and plants function more efficiently.

Devices which enable individuals to create "living water" by flowing the water in a vortex pattern through a magnetic field are known in the prior art (see U.S. Pat. No. 4,625,980). Unfortunately, these devices only produce relatively small amounts of "living water".

What is needed is an apparatus that enables individuals to make large amounts of "living water" for use in a home or business.

SUMMARY OF THE INVENTION

It is an object of the invention to provide a compact apparatus capable of manufacturing "living water".

It is another object of the invention to provide such an apparatus designed to manufacture relatively large quantities of "living water" for use in a home or business.

These and other objects are met by an apparatus designed to manufacture a relatively large quantity of "living water." The apparatus includes a plurality of cylindrical-shaped containers, hereinafter called ampuls, longitudinally aligned and connected together in an end-to-end manner to enable water to flow via gravity from an upper ampul to the lower ampuls. Each ampul includes a wide body and an integrally formed, narrow neck that transports water from the wide body of the upper ampul to the wide body on the lower ampul. Each ampul includes a fixed water dispensing unit located inside the upper section of the body. During use, water from the main inlet port or the neck on the upper ampul is delivered to the water dispensing unit. Each water dispensing unit includes two lateral arms with outlet ports formed therein that are located adjacent to the inside surface of the ampul so that water delivered to the water dispensing unit begins flowing downward in a circular pattern along the inside of the ampul. The ampul gradually narrows towards the neck so that water flowing downward in the ampul flows rapidly in a vortex pattern through the neck.

Disposed around each neck are three pairs of axially aligned magnets designed to create a magnetic field around the water as it flows through the neck. In the preferred embodiment, the apparatus includes at least two longitudinally aligned ampuls to produce the desired magnetic effect. An optional para-magnetic collar may be disposed around the neck to remove harmful contaminants from the water.

The upper ampul includes a main inlet port that connects to a main water line in the home or business. A lower ampul empties into a large holding tank that includes sensors that communicate with a sensor valve located on the main water line that automatically controls the flow of water through the apparatus when the living water located inside the holding tanks drops below a desired level.

DESCRIPTION OF THE PREFERRED EMBODIMENT(S)

Shown in the accompanying Figs. is an apparatus 10 designed to manufacture a relatively large quantity of "living water" for use in a home or business. The apparatus 10 includes a plurality of ampuls 12, 12' longitudinally aligned and connected together to enable water 90 to flow via gravity from an upper ampul 12 to a lower ampul 12'. In the preferred embodiment, the apparatus 10 uses two vertically-aligned ampuls 12, 12', however, it should be understood that three or more ampuls 12 could be used.

Figure 2:
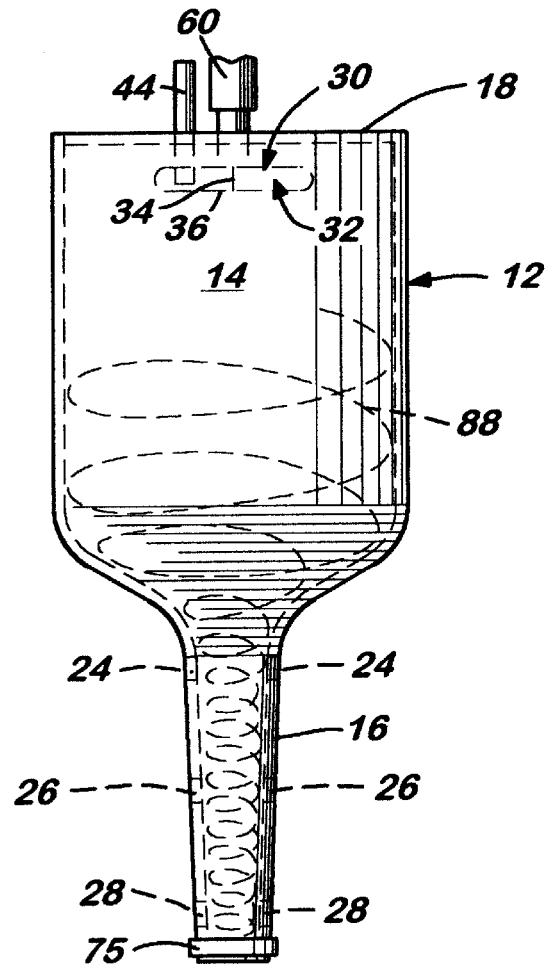
FIG. 2 is a side elevational view of the water dispensing unit located inside an ampul.

As shown in FIG. 2, each ampul 12 has a cylindrical-shaped upper body 14 and a narrow neck 16. The inside surfaces of the body 14 and neck 16 are smooth, thereby enabling water delivered to the ampul 12 to flow in a vortex pattern 88. Disposed around each neck 16 are three pairs of axially aligned magnets 24, 26, 28 designed to create a magnetic field around the water as it flows through the neck 16. Attached to the upper opening of the body 14 is a flat lid 18 to create a closed container.

Figure 1:
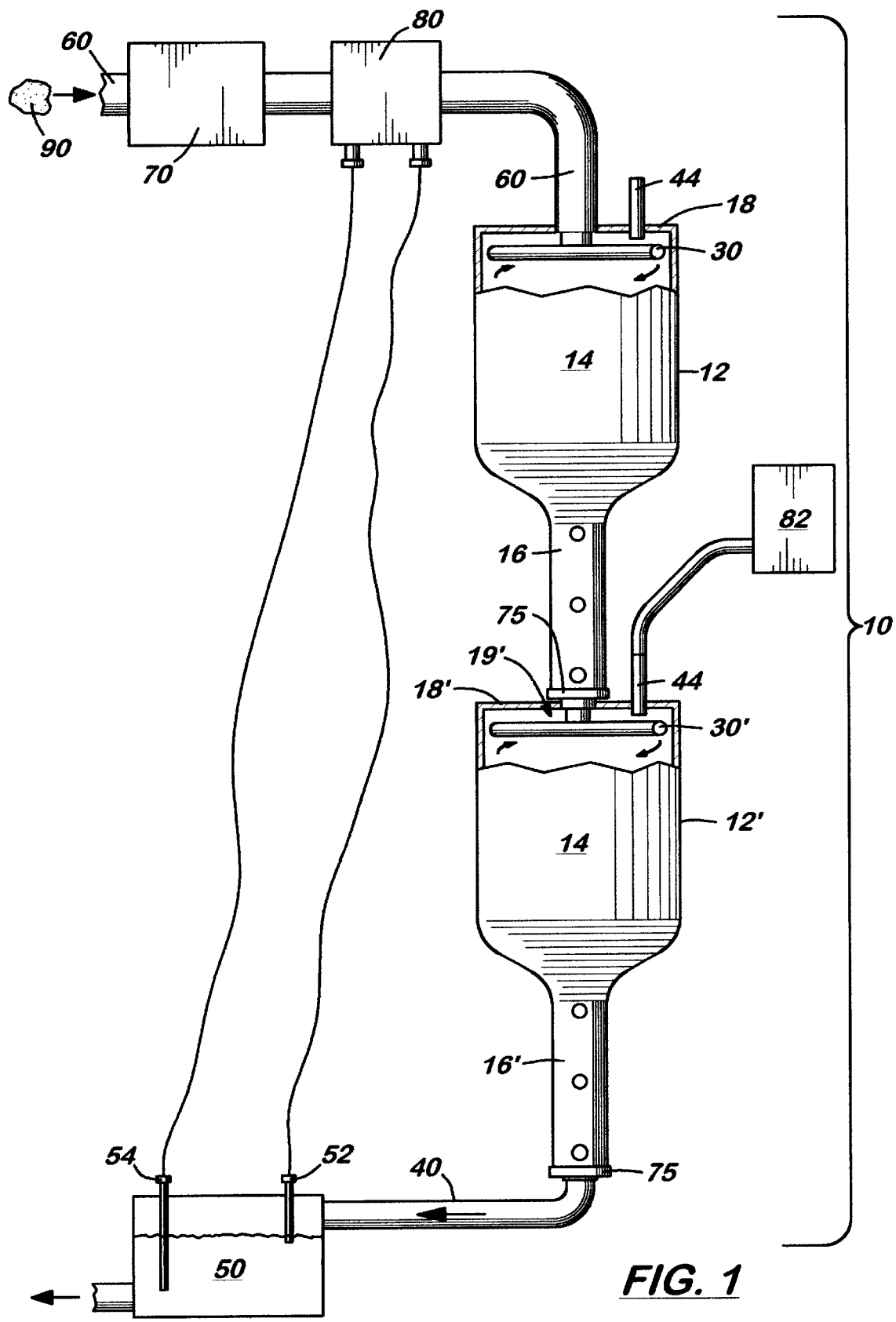
FIG. 1 is a diagram of the apparatus disclosed herein.

In the preferred embodiment shown in FIG. 1, each ampul 12 holds approximately five gallons of water. The neck 16 of each ampul 12 is approximately twelve inches in length and two to three inches in diameter. In the preferred embodiment, the region between the body 14 and neck 16 is tapered. The three pairs of magnets 24, 26, 28 are spaced apart approximately five inches and aligned on the neck 16 so that their magnetic poles are aligned. The magnets 24, 26, 28 are positioned so that their ends are approximately the same distance from the water 90 as it flows through the neck 16. During assembly, the distal end of the neck 16 on the upper ampul 12 is inserted through a hole 19' formed on the lid 18' on the lower ampul 12'.

Figure 3:
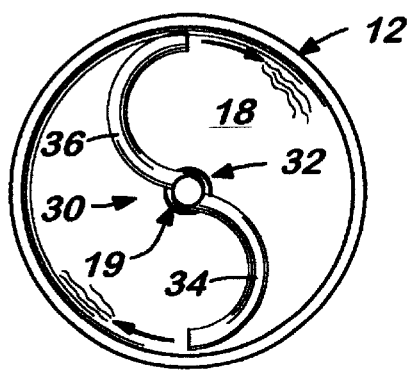
FIG. 3 is a top plan view of the water dispenser unit shown in FIG. 2.

Each ampul 12 contains a water dispensing unit 30 that discharges the water along the inside surface of the sides of the upper portion of the body 14 of the ampul 12. Each dispensing unit 30 includes a T-connector 32 that connects to the neck 16 or to the end of a main water line 60 or to the neck 16 on the upper ampul 12. As shown in FIG. 3, the two opposite lateral arms 34, 36 of the T-connector 32 are curved and extend laterally toward the inside surface of the body 14. The arms 34 and 36 are oriented so that existing water follows along the inside surface of the body 14 in a vortex pattern 88.

Formed on each ampul 14 is an air inlet port 44 that allows outside air to enter the ampul 14 during use. Attached to the air inlet port 44 is an optional oxygen source 82, which delivers a large volume of oxygen to the water.

As shown in FIG. 1, the neck 16' on the lower ampul 12' is connected to a conduit 40 which is connected at its opposite end to a large storage tank 50. The storage tank 50 includes high and low water volume sensors 52, 54, respectively, which measure the level of the water inside the storage tank 50. The sensors 52, 54 are connected to the terminals on an electric valve 80, which controls the flow of water 90 into the apparatus 10 based on the amount of water in the holding tank 50.

Water 90 is delivered via a main water line 60 to the apparatus 10. An optional filter 70 may be attached to the main water line 60, which filters the water 90. Disposed around the neck 16 or 16' is an optional para-magnetic collar 75 used to remove harmful contaminants from the water. Such collars 75 are also known as "Energy Rods" and are available from Virgin Waters Limited of Eatonville, Wash.

In compliance with the statute, the invention has been described herein in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. An apparatus for manufacturing magnetic water, comprising:
   a. a plurality of longitudinally aligned ampuls capable of holding a volume of water, each said ampul being cylindrical and including an upper wide body and a lower narrow neck, said ampul having a smooth inner surface causing water delivered to said wide body to flow in a vortex pattern when said ampul is disposed in a converted, vertically aligned position;
   b. a plurality of pairs of axially aligned magnets transversely aligned around said neck of each said ampul, said pairs of magnets on each said neck being longitudinally aligned;
   c. a water dispensing unit located inside each said wide body of said ampul, said water dispensing unit capable of dispensing water delivered to said ampul along the sides of said ampul thereby facilitating the flow of water in a vortex pattern; and
   d. at least one valve means connected to said apparatus to control the flow of water through said ampul.

2. The apparatus, as recited in claim 1, further including a holding tank connected to the lowest said ampul to collect magnetic water therefrom.

3. The apparatus, as recited in claim 2, wherein said valve means includes sensors located inside said holding tank and a valve connected to the main water line, said sensors being coupled to said valve so that water delivered to the upper ampul is controlled by the amount of magnetic water in said holding tank.

4. The apparatus, as recited in claim 1, wherein each said pair of magnets produce approximately one Gauss of magnetic field.

5. The apparatus, as recited in claim 1, wherein there are three pairs of magnets axially aligned around said neck of each said ampul.

6. The apparatus, as recited in claim 5, wherein said ampul holds approximately 5 gallons of water, said neck is approximately two inches in diameter and approximately twelve inches in length.

7. The apparatus, as recited in claim 6, wherein said pairs of magnets are aligned so that their poles are vertically aligned on said neck.

8. The apparatus, as recited in claim 7, wherein said pair of magnets are vertically spaced apart approximately five inches on said neck.

9. The apparatus, as recited in claim 1, further including a para-magnetic energy collar located on said neck of at least one said ampul.

10. An apparatus for manufacturing magnetic water, comprising:
    a. a plurality of longitudinally aligned ampuls capable of receiving a volume of water, each said ampul being cylindrical and including an upper wide body and a lower narrow neck capable of causing water delivered to said wide body to flow in a vortex pattern when said ampul disposed in a converted vertically aligned position;
    b. at least three pairs of axially aligned magnets disposed around each neck of each said ampul, each said magnet in a pair being longitudinally aligned with a magnet of a lower pair of magnets on said neck;
    c. a water dispensing unit located inside each said wide body of said ampul, said water dispensing unit capable of rotating and capable of dispensing water delivered to said ampul along the sides of said ampul causing the water to flow in a vortex pattern;
    d. a holding tank located under the lowest ampul capable of holding the water delivered from said lowest ampul;
    e. at least one sensor located inside said holding tank; and, valve connected to the main water line and coupled to said sensor, said valve capable of controlling the amount of water delivered to the upper ampul based on the amount of water in said holding tank.

* * * * *